April 24, 1951  E. O. SCHONSTEDT  2,549,857
CABLE-SUSPENDED AERODYNAMIC BODY
Filed June 27, 1946  3 Sheets-Sheet 1
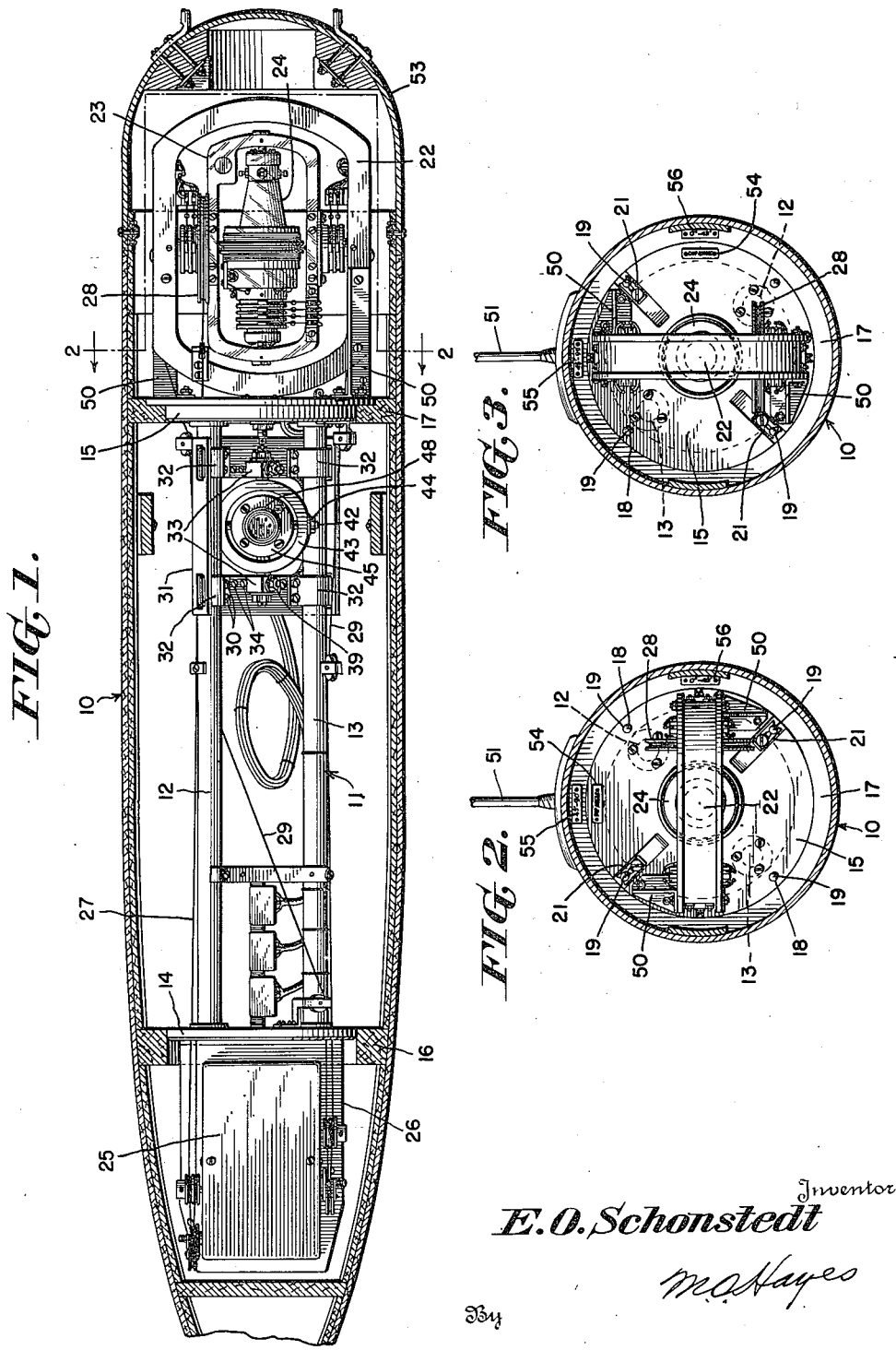
Inventor
E. O. Schonstedt
By M. O. Hayes
Attorney April 24, 1951     E. O. SCHONSTEDT     2,549,857
CABLE-SUSPENDED AERODYNAMIC BODY
Filed June 27, 1946     3 Sheets-Sheet 2
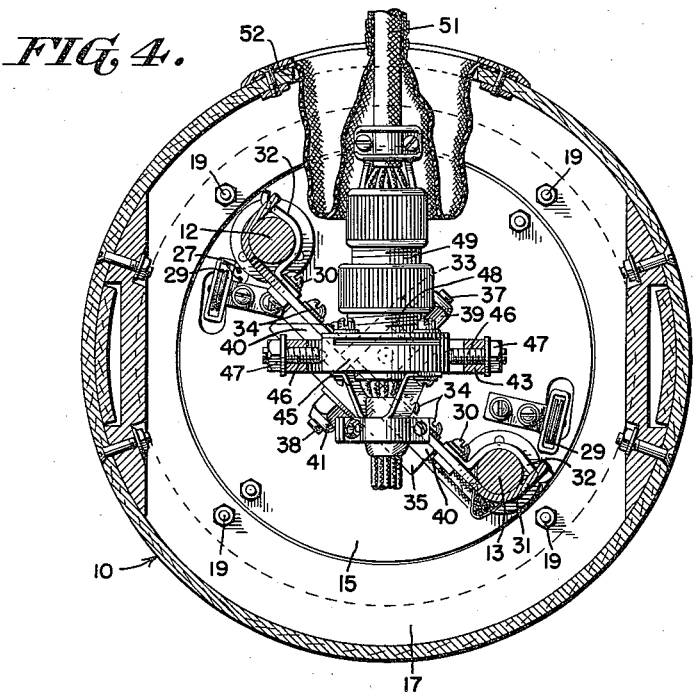
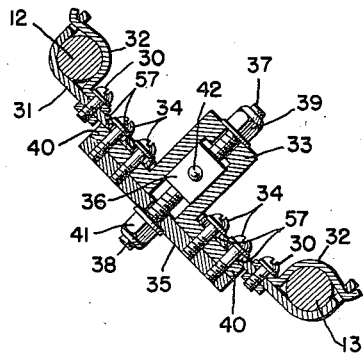
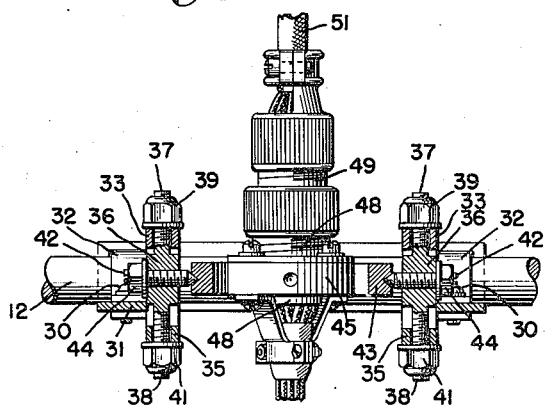
Inventor
E. O. Schonstedt
By M. A. Hayes
Attorney April 24, 1951 — E. O. SCHONSTEDT — 2,549,857
CABLE-SUSPENDED AERODYNAMIC BODY
Filed June 27, 1946 — 3 Sheets-Sheet 3

Inventor
E. O. Schonstedt
By M. O. Hayes
Attorney

Patented Apr. 24, 1951

2,549,857

UNITED STATES PATENT OFFICE 2,549,857

CABLE-SUSPENDED AERODYNAMIC BODY

Erick O. Schonstedt, Minneapolis, Minn.

Application June 27, 1946, Serial No. 679,636

11 Claims. (Cl. 177—385)

(Granted under the act of March 3, 1883, as amended April 30, 1928; 370 O. G. 757)

This invention relates generally to apparatus for rendering airborne bodies capable of stabilized flight. More specifically, the present invention relates to improvements in the apparatus disclosed and claimed in the copending application of Gerhard O. Haglund for Aerodynamic Body, Serial No. 671,341, filed May 21, 1946.

The aforesaid application discloses and claims a method and apparatus for rendering an airborne self-orienting detector magnetometer capable of being towed in stabilized flight, which result is accomplished by adjusting the point of suspension of the detector magnetometer and the supporting body therefor to coincide substantially with the cross-sectional center of form of the supporting body longitudinally of the approximate center of gravity thereof. Thereafter, the center of gravity of the body is caused to be positioned at a point substantially beneath the point of suspension.

The aforesaid application further discloses apparatus suitable for use in the detection of magnetic anomalies in the earth's magnetic field such as would be produced by the presence of submarines, sunken ships, magnetic ore deposits and the like. The apparatus comprises three coils arranged along mutually perpendicular axes, one coil being selected as the main detector and being adapted to be maintained in alignment with the direction of the lines of force of the earth's magnetic field. The coils are mounted in a gimbal assembly which, in turn, is operatively secured to a suitable framework. A drive unit is also mounted on the framework and comprises two electrical motors respectively associated with the remaining two coils which are adapted to set the motors in operation when the coils form an angle of less than ninety degrees with the earth's field, thereby to properly orient the main detector coil.

In the construction of such a magnetic airborne detector it is possible to locate the main axis of the gimbal assembly either vertical, horizontal athwartship or horizontal longitudinal. In practice however, it has been found that fixedly locating the main gimbal axis in any one of the above positions is not entirely satisfactory for all conditions of operation. Fixedly locating the main gimbal axis, for example, horizontal athwartship renders the device unsatisfactory for all conditions of operation in the regions of the earth from zero to ±forty-five degrees of magnetic dip angle for the reason that conditions are reached in which the axis of sensitivity of the main detector coil approaches within ten degrees of the main gimbal axis and the driving motors are unable to respond sufficiently rapidly to properly orient the main detector coil and spurious signals result.

The foregoing operational limitations could be obviated by manually rotating the framework, on which the gimbals are mounted, ninety degrees when it is desired to operate in those regions of small magnetic dip angles, so long as the point of suspension of the body is maintained directly over the center of gravity thereof and so long as the framework is so constructed as not to interfere with the cable connection. Due to the non-homogeneity of the structures comprising the detector apparatus and to the mis-matching of similar elements, it heretofore has been impossible to rotate the framework without disturbing the necessary relation between the point of suspension and the center of gravity.

In the arrangement of the present invention, elements movable relative to each other are provided so as to automatically locate the point of suspension of the body in a position effective to render the body capable of stabilized flight when the framework is positioned in either of the aforesaid positions spaced angularly by 90°.

An object of the present invention is to provide an airborne magnetic detector of the character disclosed in which the position of the main gimbal axis of the detector element thereof may be changed without disturbing the aerodynamic stability of the body.

Another object is to provide a body adapted to be towed in stabilized flight by an aircraft and in which the point of suspension of the body is maintained in predetermined relation with respect to the center of gravity thereof notwithstanding a change in the orientation of devices supported within the housing.

A further object is the provision of an airborne magnetic detector of the aforedescribed character in which the point of suspension thereof automatically is moved into proper relation with the center of gravity thereof as the supporting frame for the detector element is rotated within its housing.

Additional objects and advantages not specifically set forth hereinabove are those inherent in and implied from the noval construction and arrangement of the elements of the present invention, as will appear as the description proceeds with reference to the accompanying drawings, of which:

Fig. 1 is a horizontal sectional view of the bird and showing in elevation the components of the detector supported therein;

Fig. 2 is a sectional view taken along the line 2—2 of Fig. 1 and showing the main gimbal axis in the horizontal athwartship position thereof;

Fig. 3 is a view similar to Fig. 2 and showing the main gimbal axis in the vertical position thereof;

Fig. 4 is a vertical sectional view through the bird at the center of suspension thereof;

Fig. 5 is a vertical sectional view through the adjustable mounting means for the suspension gimbal;

Figure 7:
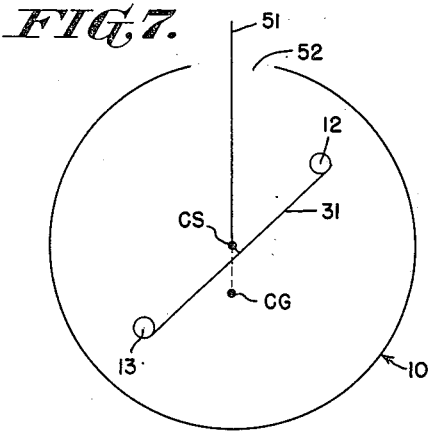

Fig. 6 is a vertical sectional view through the suspension gimbal and adjustable mounting means therefor and taken along the longitudinal axis of the bird; and Figs. 7 through 12 illustrate, in diagrammatic form, the desired relation between the center of suspension and center of gravity of the detector in each of the different positions of the main gimbal axis thereof and under various conditions of balance thereof.

Referring now to the drawings, wherein like characters of reference refer to like parts throughout the several views, and more particularly to Fig. 1 thereof, the numeral 10 generally designates a cylindrical housing or bird composed of any suitable non-magnetic material and adapted to support a framework 11 for the detector and orienting devices, as will appear in greater detail hereinafter. Framework 11 comprises 2 parallel rods 12 and 13, preferably composed of aluminum, and having disc members 14 and 15 mounted at opposite ends thereof. The framework is disposed within the bird 10 such that the disc members 14 and 15 engage the inner reenforcing rings 16 and 17 of the housing, respectively.

Disc member 15 is provided with a plurality of openings 18 adapted to receive a plurality of locking pins 19 affixed to ring 17, snap-slide fasteners 21 being provided on disc member 15 to grip the pins 19 and thereby prevent longitudinal movement of the framework within the bird.

A substantially rectangular frame 22 is secured to brackets 50 which, in turn, are fixed to disc member 15, frame 22 being adapted to support the gimbal assembly. The gimbal assembly comprises a substantially rectangular outer ring 23 rotatably supported in suitable hollow bearings carried by frame 22 and a substantially cylindrical inner member 24 rotatably supported in bearings carried by the outer ring. The axes of rotation of ring 23 and member 24 are mutually perpendicular, the axis of rotation of the outer ring hereinafter referred to as the main gimbal axis, being disposed horizontal athwartship. Inner member 24 is provided with three mutually perpendicular openings adapted to receive three coils, not shown, one of the coils being selected as the main detector coil and being adapted to be maintained in alignment with the direction of the lines of force of the earth's magnetic field as the bird is towed by an aircraft. The outer ring 24 and the inner member are driven about their respective axes of rotation by two suitable A. C. motors arranged within a housing 25 which is supported on a mounting plate 26 secured to disc member 14.

Flexible driving means in the form of a cord 27 extends from the capstan of the driving motor for the outer ring over certain idler pulleys and around a pulley 28 fixedly secured to the outer ring. Another cord 29 extends from the capstan of the driving motor for the inner member over additional pulleys, through the hollow bearings carried by the outer ring and is looped around the inner member.

A mounting plate 31 having upturned edges is affixed to rods 12 and 13 by clamping members 32 secured to the plate as by screws 30 and adapted to fit into slots cut into the plate. A pair of U-shaped members 33 having flanged edges 40 are supported on the plate 31 by means of a plurality of screws 34 and a backing plate 35. A block 36 is located in the open portion of each U-shaped member and is supported therein by means of bolts 37 and 38, one end of each bolt being secured to the block in any suitable manner. The other end of bolt 37 extends upwardly through the U-shaped member and is provided with a nut 39. The other end of bolt 38 extends downwardly through backing plate 35 and is provided with a nut 41.

Each block 36 is provided with a screw 42 extending transversely therethrough and adapted to engage openings in the outer ring 43 of a dual ring gimbal assembly to pivotally support the ring 43, suitable locking nuts 44 being provided on the screws to maintain them in an adjusted position with respect to the blocks. The inner ring 45 of this gimbal assembly is pivotally supported by screws 46 extending through the outer ring 43 at right angles to screws 42 and engaging openings in the inner ring, locking nuts 47 being provided about screws 46 to maintain them in an adjusted position.

The inner ring 46 has affixed thereto the male portion 48 of a plug connector which is adapted to receive the female portion 49 thereof in threaded relation therewith, the female portion being fixedly secured to a suitable towing cable 51 which extends from the towing craft. The bird 10 is provided with a lateral opening 52 through which cable 51 passes. The aforesaid plug connector is of a type adapted to provide a suspension means for the bird and framework and a means for transmitting electrical power to various electrical devices comprising the detector and orienting mechanism, and for a more detailed description thereof reference is made to the copending application of Erick O. Schonstedt for Anchoring Means for a Strain-Cored Electrical Cable, Serial No. 674,408, filed June 5, 1946.

As heretofore described, it frequently is necessary that the main gimbal axis be rotated ninety degrees when the detector is to be employed in regions bounded by ±forty-five degrees of magnetic dip angle. Accordingly, the rods 12 and 13 are arranged so as to form an angle of substantially forty-five degrees with the cable whereby rotation of the framework will not interfere with the cords 27 and 29 nor interfere with the cable connection. Fig. 2 shows the main gimbal axis in the horizontal athwartship position in which the detector may satisfactorily be used in regions of magnetic dip angles of from forty-five to ninety degrees. Fig. 3 shows the main gimbal axis in the vertical position in which the detector may satisfactorily be employed in regions of from zero to forty-five degrees magnetic dip angle.

Rotation of the framework to position the main gimbal axis in either of the above positions is accomplished manually by removing the nose portion 53 of the bird and releasing the snap-slide fasteners. The framework is then withdrawn slightly from the bird and rotated ninety degrees and thereafter replaced within the bird with the snap-slide fasteners being secured. In order that this rotation may accurately be accomplished, a nameplate 54 is appropriately arranged on the disc member 15 and bears the words "dip angle," this plate being adapted to be aligned with either one of two different nameplates 55 and 56 arranged on the reenforcing ring 17 in ninety degree angular space relation. Plate 55 bears the indicia forty-five degrees to ninety degrees such that alignment of plate 54 therewith corresponds to positioning the main gimbal axis horizontal athwartship, while plate 56 bears the indicia zero degrees to forty-five degrees such that alignment of plate 54 therewith corresponds to positioning the main gimbal axis vertically.

As heretofore described, in order to provide an aerodynamically stable airborne detector it is necessary that the center of suspension of the detector and bird as provided by the suspension gimbal assembly comprising rings 43 and 45 be located directly over the center of gravity of the detector and bird, notwithstanding the location of the main gimbal axis within the bird.

Figure 8:
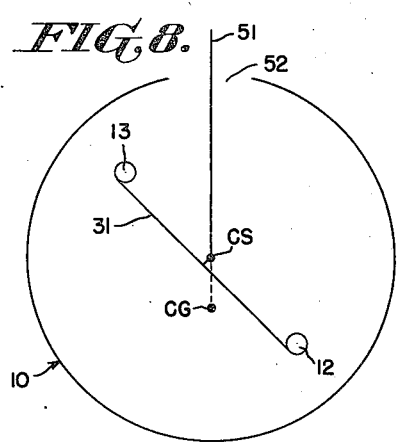

Figs. 7 through 12 illustrate three conditions which may arise upon rotation of the framework ninety degrees. Fig. 7 shows the relation between the center of suspension, indicated as CS, and the center of gravity, indicated as CG, with the main gimbal axis horizontal athwarthship when both the bird and framework are balanced. Under such conditions, the CS is located directly above the CG and after rotation of the framework through ninety degrees the CS is still located directly above the CG as shown in Fig. 8. When the bird and framework are each balanced, the CS need only be adjusted, when the detector is assembled, for one position of the framework since the desired relation between the CS and CG is not disturbed by subsequent rotation of the framework. The aforesaid adjustment of the CS comprises positioning the suspension point, provided by the suspension gimbal, at different points along the longitudinal axis of the bird by loosening screws 30 and sliding the mounting plate 31 for the suspension gimbal along the length of rods 12 and 13.

Figure 9:
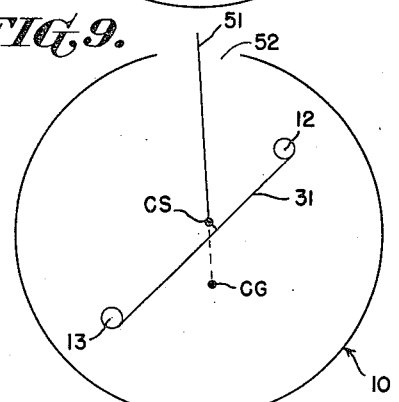
Figure 10:
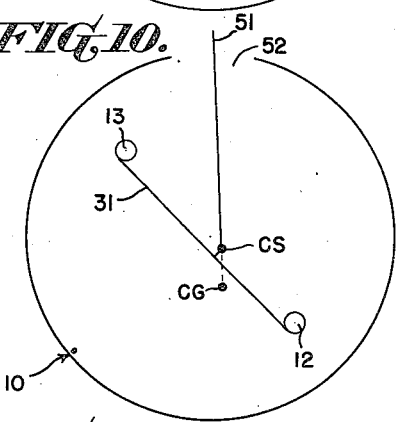

Figs. 9 and 10 illustrate the position of the CS with respect to the CG with the main gimbal axis horizontal athwartship and vertical, respectively, when the framework is balanced and the bird is not balanced. Under this condition, as well as that shown in Figs. 7 and 8, rotation of the framework does not change the position of the CG since the framework itself is balanced. For the initial position of the main gimbal axis, horizontal athwartship, a balance of the detector is obtained in the manner described heretofore. After rotation of the framework through ninety degrees, the desired relation between the CS and CG is disturbed and it is necessary to adjust the CS in two mutually perpendicular directions, by trial and error, until a condition of balance for both positions of the framework is obtained.

Adjustment of the CS in two mutually perpendicular directions is accomplished in the following manner. Screws 34 extend through elongated slots 57 in mounting plate 31 and by loosening these screws, the mounting plate, and suspension gimbal carried thereby, may be moved in either direction transversely of rods 12 and 13. Vertical adjustment with respect to rods 12 and 13 is accomplished by either loosening nuts 39 and tightening nuts 41, thereby causing blocks 36 and outer ring 43 of the suspension gimbal to move downwardly with respect to the rods, or by loosening nuts 41 and tightening nuts 39, thereby causing the blocks and outer ring to move upwardly with respect to the rods.

Figure 11:
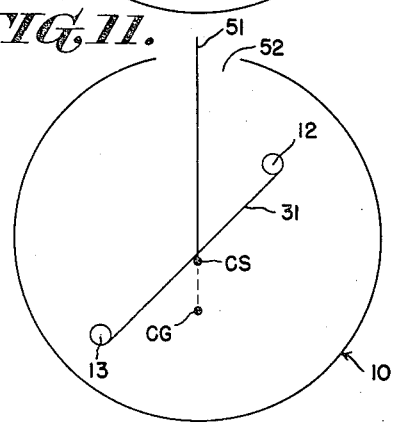
Figure 12:
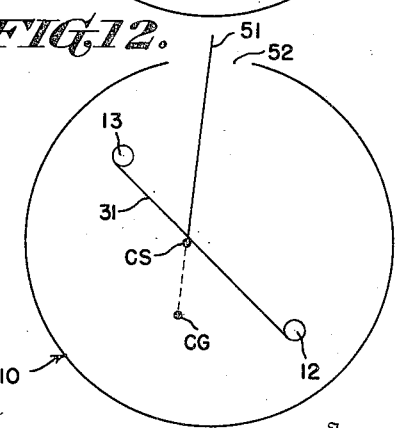

Figs. 11 and 12 illustrate the desired position of the CS with respect to the CG for location of the main gimbal axis horizontal athwartship and vertical, respectively, and in which both the framework and bird are unsymmetrical. Under this condition, the CG of the detector shifts upon rotation of the framework but by adjusting the CS in the manner heretofore described, the desired relation of the CG therewith may be obtained for both positions of the main gimbal axis.

From the foregoing, it should be apparent that apparatus has been provided which is well adapted to fulfill the aforesaid objects of the invention.

While the invention has been described in particularity with reference to an example thereof which gives satisfactory results, it readily will be apparent to those skilled in the art to which the invention appertains, after understanding the invention, that further modifications, embodiments and changes may be made therein without departing from the spirit and scope thereof, as defined by the claims appended hereto.

The present invention may be manufactured and used by or for the Government of the United States of America for governmental purposes without payment of any royalties thereon or therefor.

What is claimed as new and desired to be secured by Letters Patent of the United States is:

1. In an aerodynamic body of the character disclosed having stability in flight when towed from an aircraft, the combination of a substantially cylindrical housing, a framework rotatably mounted within the housing and for rotation about the longitudinal axis thereof, means for locking said framework in either one of two positions in predetermined spaced angular relation with respect to each other, and means for suspending said body from the aircraft and pivotally secured to the framework at a predetermined point therein effective to render the body stable in flight when the framework is moved into either one of said two positions.

2. In an aerodynamic body of the character disclosed adapted to be towed in stable flight from an aircraft, the combination of a substantially cylindrical housing having an opening therein, a framework within the housing and adapted to be moved about the longitudinal axis thereof into either one of two positions in predetermined spaced angular relation with respect to each other, means pivotally secured to the framework to effect a point suspension of the body and including a towing cable extending through said opening, and means for adjustably positioning said suspension means with respect to the framework so that said suspension point is positioned directly above the center of gravity of the body and said cable is maintained substantially at the center of said opening when the framework is moved into either one of said two positions.

3. In an aerodynamic body of the character disclosed adapted to be towed in stable flight from an aircraft, the combination of a substantially cylindrical housing, a framework disposed within the housing and mounted for movement about the longitudinal axis thereof, means for releasably securing the framework in either one of two moved positions of the framework disposed in predetermined angularly spaced relation with respect to each other, a gimbal mechanism having outer and inner rings mounted one within the other on mutually perpendicular axes, adjustable means for supporting said outer ring on the framework so that the axis of rotation thereof may be adjustably spaced in parallel relation to the longitudinal axis of the housing in two mutually perpendicular directions, and means secured to the inner ring for suspending the body at the point of intersection of the gimbal axes whereby the center of gravity of the body may be disposed directly beneath the point of suspension thereof when the framework is moved into either one of said two positions.

4. In an aerodynamic body of the character disclosed adapted to be towed in stable flight from an aircraft, the combination of a substantially cylindrical housing, a framework disposed within the housing for movement about the longitudinal axis thereof, means for locking said framework to either one of two angularly spaced positions, a gimbal mechanism carried by the framework with the main axis thereof disposed transversely of the longitudinal axis of the housing, a detector element supported on the inner ring of the gimbal mechanism in perpendicular relation thereto and adapted to be maintained substantially in alignment with the direction of the earth's magnetic field, said framework being movable to either of said positions thereof to prevent substantial alignment of the detector element with said main gimbal axis, and means including a second gimbal mechanism for suspending said body from the aircraft and pivotally secured to the framework at a predetermined point therein effective to render the body stable in flight when the framework is moved into either one of said two positions thereof.

5. In an aerodynamic body of the character disclosed adapted to be towed in stable flight from an aircraft, the combination of a substantially cylindrical housing, a framework disposed within the housing and movable about the longitudinal axis thereof, a gimbal mechanism supported on said framework with the main axis thereof disposed transversely to the longitudinal axis of the housing and comprising inner and outer rings rotatable about mutually perpendicular axes, a detector element carried by the inner ring and adapted to be maintained substantially in alignment with the direction of the earth's magnetic field, means for releasably retaining the framework in two angularly spaced positions in which the main gimbal axis is disposed in two mutually perpendicular directions respectively, means pivotally secured to the framework for effecting a point suspension of the body, and means for adjustably positioning said suspension means with respect to the framework so as to shift said suspension point in three mutually perpendicular directions with respect to the axis of the housing whereby said point is positioned directly above the center of gravity of the body when the framework is positioned in either one of said two positions thereof.

6. In an aerodynamic body of the character disclosed, adapted to be towed in stable flight from an aircraft, the combination of a substantially cylindrical housing having a lateral opening therein, a framework disposed within the housing for movement about the longitudinal axis thereof into either one of two angularly spaced positions, means including a cable extending through said opening and pivotally secured to the framework for effecting a point suspension of the body, said framework comprising a pair of spaced members extending longitudinally of the housing for supporting said suspension means therebetween and disposed substantially diagonally of said cable for either position of the framework whereby the framework may be moved between said positions thereof while maintaining the connections of the cable therewith, and means for adjustably positioning said suspension means with respect to the framework so as to shift said suspension point in two mutually perpendicular directions transversely of the axis of the housing whereby the suspension means may be fixed at a point adapted to render the body stable in flight for either position of the framework in the housing.

7. In an aerodynamic body of the character disclosed adapted to be towed in stable flight from an aircraft, the combination of a framework adapted to be moved within the body about an axis thereof and comprising a pair of members disposed in spaced parallel relation on opposite sides of said axis, means pivotally supported between said members for effecting a point suspension of the body, and means for adjustably positioning said suspension means with respect to said members so as to shift said suspension point in two mutually perpendicular directions transversely of said axis whereby the suspension means may be fixed in a position adapted to render the body stable in flight for different moved positions of the framework about the axis.

8. In an aerodynamic body of the character disclosed adapted to be towed in stable flight from an aircraft, the combination of a framework adapted to be moved within the body about an axis thereof and comprising a pair of members disposed on opposite sides of said axis in spaced parallel relation therewith, a transverse member interconnecting said pair of members and adapted to be releasably secured thereto in any one of a plurality of positions along the length thereof, a pair of U-shaped members having a pair of adjustable pivot supports and supported on said transverse member in spaced relation thereon such that said pivot supports form an axis which is generally in alignment with said body axis, means individual to said U-shaped members for adjustably securing the same in any one of a plurality of positions intermediate said pair of framework members whereby said U-shaped members and the pivot supports may be adjusted to provide an optimum spaced relation between said axes adapted to render the body stable in flight for different moved positions of the framework about said body axis, and means supported by said pivot supports and pivotal about the axis thereof for effecting a point suspension of the body.

9. In an aerodynamic body of the character disclosed adapted to be towed in stable flight from an aircraft, the combination of a pair of members disposed within the body in predetermined fixed spaced relation on opposite sides of an axis therein and adapted to be moved as a unitary framework thereabout, a member interconnecting said pair of members, a pair of U-shaped members supported in spaced relation on said interconnecting member and transversely thereof with the openings in the U-shaped members in general alignment with said axis, means for adjustably securing each of said U-shaped members to the interconnecting member in any one of a plurality of positions thereon intermediate said pair of framework members, a pair of pivot supports individual to said pair of U-members and slideably mounted between the legs thereof, means individual to each of the U-members for adjustably securing the pivot support in any one of a plurality of moved positions in spaced relation to the bight portion thereof, and means supported by said pivot supports for effecting a point suspension of said body.

10. In an aerodynamic body of the character disclosed, the combination of a gimbal assembly, a field sensing element carried by said gimbal assembly and adapted to be maintained in alignment with the direction of lines of force of the earth's magnetic field, a framework rotatably mounted in said body for supporting said gimbal assembly, means for locking said framework within the body in either one of two different positions thereon so as to locate the main gimbal axis in different positions and thereby prevent the axis of sensitivity of the element from aligning with the main gimbal axis in any region of operation, and means including a second gimbal assembly for suspending the body and pivotally secured to the framework at a predetermined point therein effective to render the body stable in flight when the body is towed with the framework in either one of said two positions thereof.

11. In an aerodynamic body of the character disclosed adapted to be towed in stable flight from an aircraft, the combination of an aerodynamically stable body having an opening therein, a framework within the housing and adapted to be moved about the longitudinal axis thereof into a plurality of positions thereabout, means pivotally secured to the framework to effect a point suspension of the body and including a towing cable exending through said opening, and means for adjustably positioning said suspension means with respect to the framework so that said suspension point is positioned directly above center of gravity of the body and said cable is maintained substantially at the center of said opening after the framework has been moved from one to another of said plurality of positions.

ERICK O. SCHONSTEDT.

REFERENCES CITED

The following references are of record in the file of this patent:

UNITED STATES PATENTS

| Number | Name | Date |
|---|---|---|
| 1,977,198 | Nicolson | Oct. 16, 1934 |
| 2,241,637 | Ernst et al. | May 13, 1941 |
| 2,397,137 | Glennon et al. | Mar. 26, 1946 |
| 2,404,806 | Lindsey | July 30, 1946 |
| 2,424,772 | Rieber | July 29, 1947 |